Figure 1:
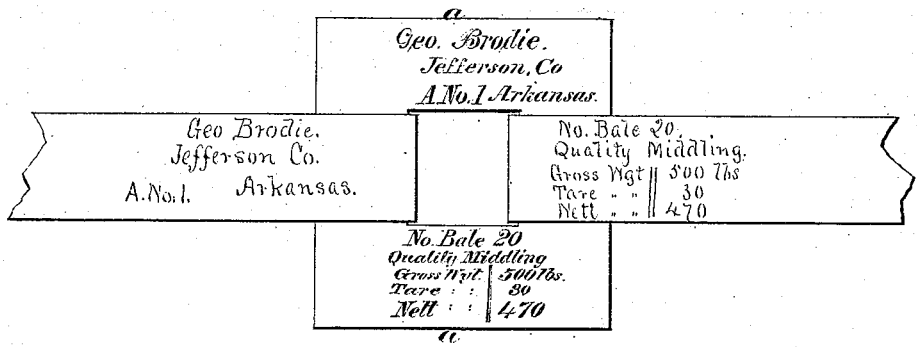
Figure 2:
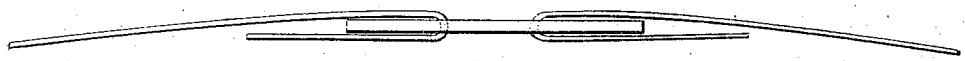

G. BRODIE.
Bale-Ties.

No. 142,894.    Patented September 16, 1873.

Witnesses.
R. Campbell
J. N. Campbell

Inventor.
Geo. Brodie
by
Munn Fenwick & Lawrence

UNITED STATES PATENT OFFICE.

GEORGE BRODIE, OF PLUM BAYOU, ARKANSAS.

IMPROVEMENT IN BALE-TIES.

Specification forming part of Letters Patent No. 142,894, dated September 16, 1873; application filed April 22, 1870.

*To all whom it may concern:*

Be it known that I, GEORGE BRODIE, of Plum Bayou, in the county of Jefferson and State of Arkansas, have invented an Improvement in the Means of Identifying Cotton and other materials after the same is baled ready for market; and I do hereby declare the following to be a full and correct description of such invention.

One great inconvenience to which all dealers in cotton are subjected grows out of the difficulty of identifying their property. The different bales have a general resemblance to each other, and when those belonging to different owners become mingled together it is difficult and sometimes impossible to separate them so as to know who is the rightful owner of each. It is also often of great importance to know from whom the different bales have been purchased, so that frauds which are sometimes practiced may be traced to their respective perpetrators.

The inconvenience above stated is removed, and the object above expressed is attained, by my invention more completely than by any means previously proposed, and which consists in stamping, or otherwise indelibly marking on the face of the tie-plate or buckle or the band or hoop, the name of the planter and the county and State in which he resides, or any other inscription or character, such as number, letter, trade-mark, &c., which will unmistakably serve to identify the bale, or give such information as to weight, quality, &c., as may be desired. Thus the great advantage of my invention is that I secure a thorough and durable means of identification, not by the employment of an independent or additional mechanical feature, but by indenting the marks of identification on the blank surface of the tie or band, and which prevents the means used for identifying being obliterated or removed without breaking up the bale. To this end my invention consists in securing the bales with metallic bands and buckles having the name of the producer of the cotton, or maker or owner of the bale, and the county and State in which he resides, the gross and net weight of the bale, and perhaps its quality might also be denoted, and also the year in which the cotton was grown; but other figures or devices may be substituted or added without any departure from the general idea which is embodied in my invention. These words, figures, or devices may be placed upon all the ties or only upon a portion thereof, at the pleasure of the person by whom the cotton is baled; or the inscriptions above contemplated may be placed upon the metal hoops by which the cotton is confined in the bales, instead of being stamped or otherwise indeliby fixed upon the ties by which those hoops are secured in place, though I greatly prefer their being placed on the ties, as above shown.

I am aware that checks have been attached to cotton-bales for purposes similar to those hereinbefore contemplated; but these checks were intended to be attached to the bales, and not to form an integral part thereof. They were constantly liable to be torn off or removed by accident or design, and could not, therefore, be relied upon for the purpose for which they were used. I propose to render those marks, words, and figures irremovable. I am also aware of the fact that the clasps or fastenings upon soldiers' belts have been used to designate the company or regiment to which the soldier belonged, and perhaps some other facts in relation to his condition; but this is only the equivalent of the check which is sometimes attached to cotton-bales, as above mentioned. It can be removed and exchanged with the same facility, whereas the mark as contrived and applied by me is essentially different in this respect. It cannot be removed or exchanged without breaking up the bale, which would interpose such difficulties in the way of deception or mistake as to render such things impracticable; but

What I claim as my invention, and desire to secure by Letters Patent, is—

The method of securing and identifying bales of cotton and like material, and providing against the possible loss or detachment of the marks of identity except by disruption of the bale, by means of metallic bands and tie-plates having the names and characters indicating ownership, quality, weight, &c., indelibly stamped upon the said bands and plates, or either of them, substantially as described.

GEORGE BRODIE.

Witnesses:
J. N. CAMPBELL,
EDM. F. BROWN.